March 26, 1940.  O. V. MALMQUIST ET AL  2,194,859
TOASTER AND CONTROL MECHANISM THEREFOR
Filed March 29, 1937   2 Sheets-Sheet 1

Inventor
OSCAR V. MALMQUIST
FREDERICK J. FISCHER
By Chas. C. Reyf.
Attorney

March 26, 1940.   O. V. MALMQUIST ET AL   2,194,859
TOASTER AND CONTROL MECHANISM THEREFOR
Filed March 29, 1937   2 Sheets-Sheet 2

Therostatic Member

Inventor
OSCAR V. MALMQUIST
FREDERICK J. FISCHER
By Chas. C. Reif
Attorney

Patented Mar. 26, 1940

2,194,859

UNITED STATES PATENT OFFICE 2,194,859

TOASTER AND CONTROL MECHANISM THEREFOR

Oscar V. Malmquist and Frederick J. Fischer, Minneapolis, Minn.

Application March 29, 1937, Serial No. 133,535

11 Claims. (Cl. 161—16)

This invention relates to a toasting device and while the device might be used for heating or toasting various articles, it is designed mostly for toasting slices of bread.

It is desirable to have a toasting device having a toast-supporting member which is movable to toasting position within a casing and which is movable to non-toasting position to bring the toast partly out of the casing so that it can be conveniently removed. It is also desirable to have a simple and efficient means for operating said toast-supporting member and to have a simple and efficient means cooperating with said means for variably determining the time of the toasting operation. It is further desirable to have the casing closed during the toasting operation.

It is an object of this invention, therefore, to provide a toasting device with simple automatically operated means for moving the toast-carrying member to non-toasting position.

It is another object of the invention to provide a toaster with simple and efficient means for variably determining the time of the toasting operation.

It is a further object of the invention to provide a casing having heating means therein and one or more openings for receiving material to be toasted, a closure member or members for said opening or openings and simple automatically operated means for operating said closure or closures.

It is still another object of the invention to provide a time controlling means comprising a solenoid, a core movable thereinto, a plunger carried by said core, a cylinder containing liquid in which said plunger is disposed, said liquid acting to retard the movement of said plunger and core.

It is still further an object of the invention to provide a toaster having means for variably determining the period of the toasting operation and means cooperating with said means to vary said period depending upon whether the toaster is in cold or heated condition.

These and other objects and advantages of the invention will be fully set forth in the following description made in connection with the accompanying drawings in which like reference characters refer to similar parts throughout the several views and in which.

Figures 1, 2:
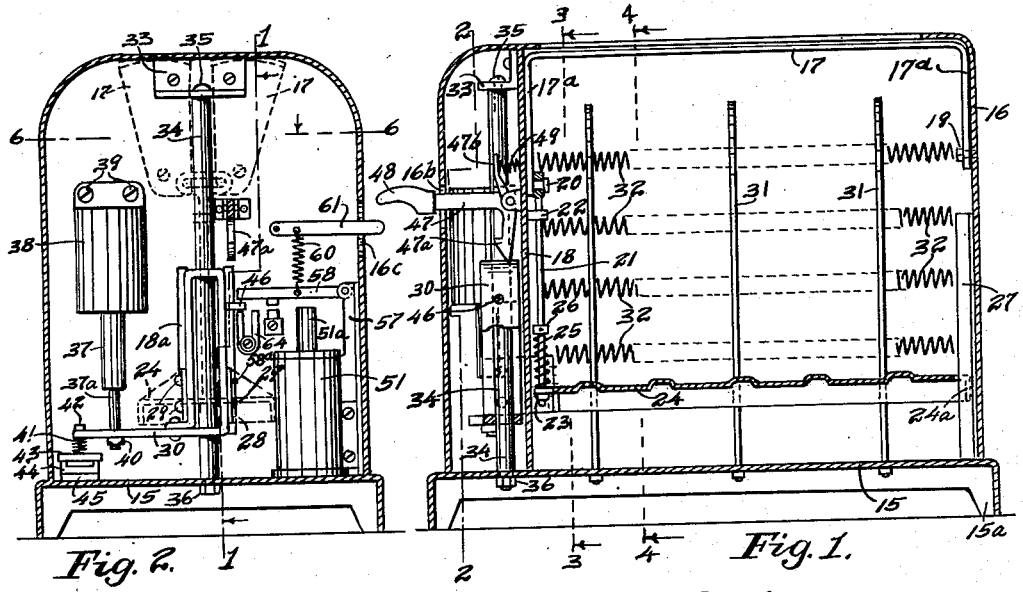
Fig. 1 is a vertical section taken substantially on line 1—1 of Fig. 2 as indicated by the arrows.
Fig. 2 is a view in vertical section taken on line 2—2 of Fig. 1 as indicated by the arrows.
Figures 3, 4:
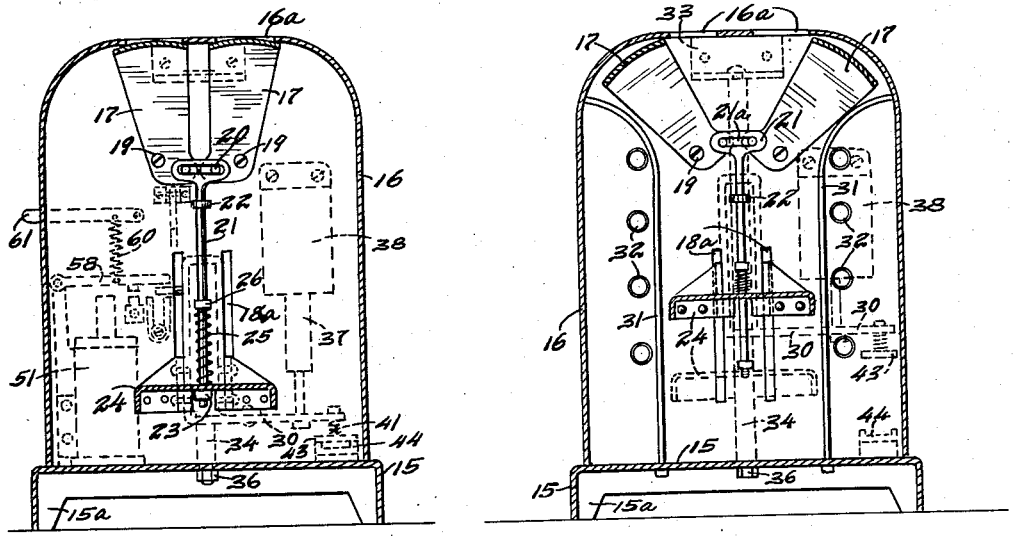
Fig. 3 is a view in vertical section taken on line 3—3 of Fig. 1 as indicated by the arrows.
Fig. 4 is a vertical section on line 4—4 of Fig. 1 as indicated by the arrows.
Figure 5:
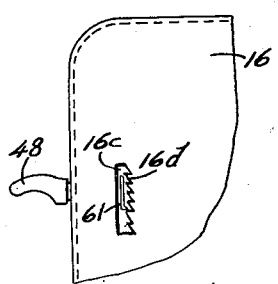
Fig. 5 is a partial view in side elevation as seen from the right of Fig. 2.
Figure 6:
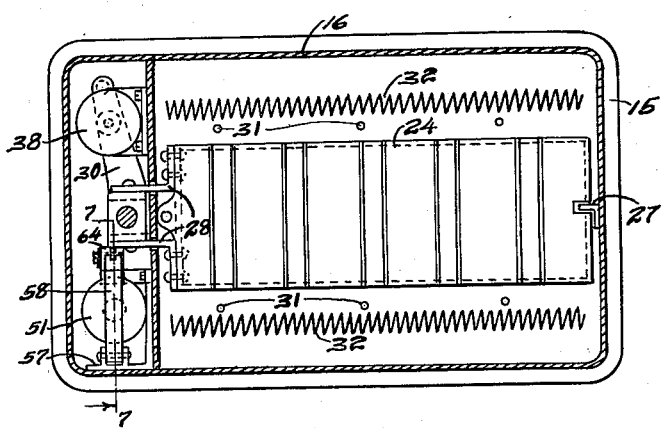
Fig. 6 is a horizontal section taken on line 6—6 of Fig. 1 as indicated by the arrow.
Figure 8:
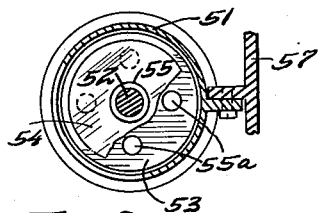
Fig. 8 is a horizontal section on line 8—8 of Fig. 7 as indicated by the arrow.
Figure 7:
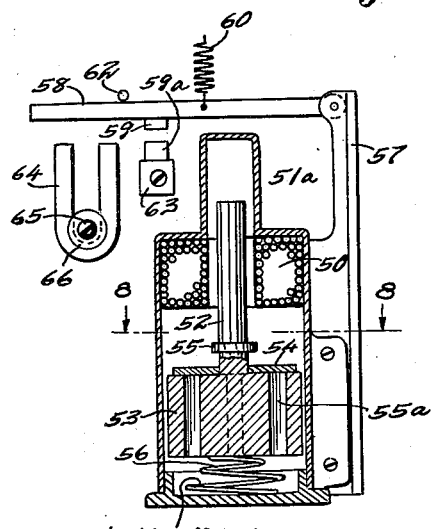
Fig. 7 is a vertical section taken for the most part on line 7—7 of Fig. 6 as indicated by the arrow.

Referring to the drawings, a toasting device is shown comprising a casing having a base member 15 shown as formed from a plate substantially rectangular in plan having flanges 15a at right angles thereto forming legs at the corners thereof, said flanges being partly cut away between said legs. Said casing also comprises a housing portion 16 supported on base 15 and while this might be of various forms, it also is shown as substantially rectangular in horizontal and vertical cross section, the side portions curving into the top portion. Casing 16 has in its top openings 16a and while two of these are shown the number can, of course, be varied to suit the pieces of material to be toasted. Openings 16a may be closed by doors or closure members 17 shown as curved plates having end portions 17a disposed adjacent one end of casing 16 and adjacent a vertical partition 18 therein, said portions 17a at one end of said casing being pivoted thereto by the screws 19. The portions 17a at the other ends of members 17 are connected by headed screws 20 to an operating member 21. Member 21 has a widened head at its upper end having a horizontal slot 21a therein and the shanks of members 20 extend through this slot and are free to move therein. It will be noted that members 20 are spaced from and thus eccentric to the pivot members 19. The member 21 is formed as a rod below said head portion and is vertically movable in a small guide bracket 22 secured to partition 18. Said rod is threaded at its lower end to receive a nut 23 disposed below a toast-supporting member 24 through which said rod extends. A coiled compression spring 25 surrounds rod 21 and engages member 24 at its lower end and a collar 26 at its upper end secured to member 21. With the described construction it will be seen that when member 24 moves upwardly member 21 will be moved through the spring 25 and doors 17 swung to open position as shown in Fig. 4 and when member 24 moves to its lower position member 21 will be moved downwardly by member 24 engaging nut 23 and the doors moved to closed position as shown in Fig. 3.

The toast-supporting member 24 has a flange 24a at one end movable between guide members 27 at one end of casing 16. Said member 24 has secured to its other end angle members 28 having one flange thereof movable through and in vertical slots 18a in partition 18, said angle members 28 being rigidly secured by rivets 29 to a member 30 to be later more fully described. Guide rods 31 are shown secured in casing 16 at each side of member 24, said rods curving outwardly to the sides of casing 16 at their upper ends. Electrical heating members or coils 32 are indicated at the outer sides of rods 31 and will be supplied with electric current from a suitable circuit. Such heating members are commonly used in toasters and as their construction forms no part of the present invention, further illustration of the same is considered unnecessary. A small bracket 33 is secured to the outer side of partition 18 at the top thereof having a horizontally projecting flange and a guide rod 34 shown as cylindrical in form extends from the lower side of said flange to the top of plate 15. Said rod is secured by a screw 35 extending through bracket 18 into its upper end and by having a nut 36 threaded on its lower reduced end, which end extends through plate 15. Member 30 illustrated as formed from a flat bar is bent into rectangular form and has the bottom and top of said rectangular portion slidable on rod or guide member 34. Member 30 extends to one side of member 34 and has secured thereto the lower reduced end 37a of a core member 37 movable into and out of a solenoid 38 having a casing secured to the outer side of partition 18 by the screws 39. Portion 37a extends through the shoe member 30 and has a nut 40 threaded thereon below said member. A coiled spring 41 has its upper end secured at the end of member 30 by a bolt 42, the lower end of said spring being connected to and carrying a contact member 43 adapted to engage with another contact member 44 supported upon an insulating block 45 carried on plate 15. A member 30 which is movable vertically with toast-supporting member 24 has a laterally projecting pin 46 at the side opposite that on which solenoid 38 is disposed, which pin is adapted to move and cooperate with a latch member 47a forming part of a bell crank lever 47, the end of which extends through a slot 16b in the end of casing 16 and is equipped with a handle 48. A tensile coiled spring 49 is secured to an arm 47b of lever 47 and holds the same in position with latch 47a moved forwardly. Latch 47a has a step or shoulder thereon adapted to support pin 46 and members 24 and 30 when the same have been lifted to non-toasting position.

Another solenoid 50 is carried in a cylindrical casing 51 and has a movable core 52 adapted to be moved thereinto, the lower end of which has secured thereto a plunger member 53 movable in cylinder 51. Cylinder 51 contains some liquid, such as an oil, and movement of plunger 53 upwardly with core 52 is retarded by said liquid as the latter must move down around plunger 53 and through the small space between the same and the wall of cylinder 51. Plunger 53 has a plurality of holes 53a extending therethrough and a diaphragm or disk 54 has an opening surrounding core 52 and rests on top of plunger 53 covering holes 53a. A collar 55 is secured to core 52 a short distance above plunger 53 and limits the upward movement of disk 54. Cylinder 51 is, of course, sealed against the passage of any liquid therefrom and the same has an upwardly extending projection 51a to accommodate movement of core 52. A thermostat member 56 shown as a tapered helical spring is secured to the bottom of cylinder 51 and extends upwardly a short distance therein, the same supporting plunger 53 when core 52 is released. Cylinder 51 has a bracket 57 extending upwardly at one side thereof to which is pivoted a horizontally extending bar 58 carrying an electrical contact member 59. Bar 58 is held upwardly by a coiled tensile spring 60 which is secured at its upper end intermediate the ends of a small hand lever 61 pivoted at one end to partition 18 and projects through a slot 16c in one side of casing 16, one side of said slot being provided with ratchet teeth 16d with which the pawl-like side of lever 61 cooperates. Movement of bar 58 upwardly is limited by a stop pin 62 projecting from partition 18. Another contact 59a is provided adapted to be engaged by contact 59, the same being supported in a small insulating bracket 63 secured to partition member 18. A permanent magnet 64 is provided suitably supported on a bolt 65 engaging partition 18, a washer 66 being shown as disposed under the head of bolt 65. A projection 58a carried by one of the members 28, which projection may be somewhat resilient, extends outwardly so as to engage bar 58 when pin 46 is a short distance above latch 47a.

Figure 10:
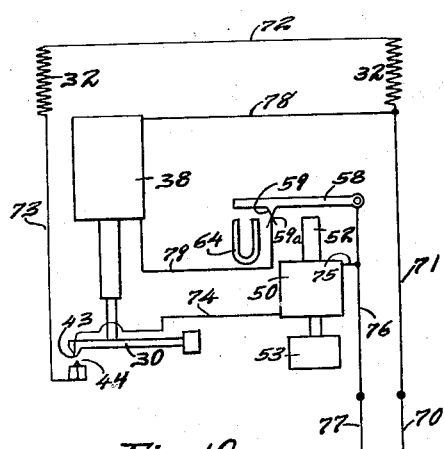
Fig. 10 is a wiring diagram for the device.

As shown in the diagram in Fig. 10 the heating elements 32 are connected in series in a circuit including the winding of solenoid 50. This circuit may be traced from one line conductor 70, a conductor 71 extending to one heating element 32, a conductor 72 extending between said elements and a conductor 73 extending to contact member 45. Another conductor 74 extends from contact member 43 to one end of the winding of solenoid 50 and a conductor 75 extends from the other end of said winding to a conductor 76 which extends to the other line conductor 77. A conductor 78 extends from conductor 71 to one end of the winding of solenoid 38. Another conductor 79 extends from the other end of the winding of solenoid 38 to contact member 59a. The circuit is continued through bar 58 and through conductor 76 to line conductor 77.

When in inoperative position toast-carrying member 24 will occupy its upper or non-toasting position shown in Fig. 4. At this time doors 17 will be in open position as shown in Fig. 4 and pin 46 will be engaged with latch 47a and the member 24 supported thereby. When toast is to be made the operator will insert the slices of bread through openings 16a and the same will rest on member 24. At this time solenoid 38 is deenergized and the operator merely has to press downwardly on handle 48 and swing lever 47 so that latch 47a is swung inwardly or toward partition 18 against the tension of spring 49. This movement of said latch releases pin 46 and toast-supporting member 24 moves downwardly by gravity as does also member 30. The latter carries with it core 37 and its extension 37a. When member 30 moves downwardly contact 43 engages contact 44 and the circuit including heating members 32 and solenoid 50 is closed. The toasting operation is now begun as members 32 are heated and solenoid 50 exerts an upward pull on its core 52. The upward movement of said core, however, is retarded as movement of plunger 53 is retarded by the passage of liquid around the same. After a certain time core 52 will be moved upward to a position where it will magnetically attract bar 58 and move the same downwardly against the tension of spring 60. When this occurs contact 59 will be engaged with contact 59a. This will close a circuit through solenoid 38 and core 37 will be pulled upwardly thus lifting member 30 and member 24. The pin 46 will operate and engage with latch 47a and member 24 will be held in its upper or non-toasting position. Doors 17 will be swung open as member 24 will be moved upwardly. Bar 58 will be held in its lower position by permanent magnet 64. When member 30 moves upwardly with members 28, projection 58a will engage the end of bar 58 after pin 46 has traveled a short distance past latch 47a. Bar 58 is thus lifted and contacts 59 and 59a are separated thus deenergizing solenoid 38. The toast-carrier is now released and pin 46 will seat in latch 47a holding toast-carrier 24 in its upper position. When solenoid 38 operated contacts 43 and 44 were separated, solenoid 50 deenergized and the circuit through heating elements 32 broken. Plunger 53 begins to descend in cylinder 51 by gravity and can move rapidly as the liquid in cylinder 51 can pass through holes 55a lifting disk 54 so that said plunger and core 52 will quickly reach their lower position.

When the toaster is cold from not having been used for some time, it would take a little longer to properly toast the material than when the toaster is well heated from continued use. When the toaster has been heated from use thermostat member 56 will expand and its upper end will occupy a higher position than when the toaster is cold. Plunger 53 will thus have a higher initial position and will not have to be moved so far when the toaster is hot as it will when the toaster is cold. The time for toasting when the toaster is hot will therefore be somewhat reduced by the action of thermostat member 56. Correspondingly when the toaster is cold the toasting period will be somewhat lengthened by thermostat 56. The toasting period can also be varied by varying the position of lever 61 in the ratchet teeth 16d. This varies the tension on spring 60. With a greater tension core 52 will have to approach nearer the bar 58 to move the same. This will lengthen the toasting period. With a lesser tension on spring 60 bar 58 will be moved when core 52 is farther therefrom, thus shortening the toasting period.

Figure 9:
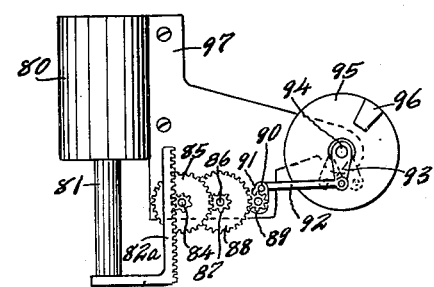
Fig. 9 is a view in side elevation of a modified construction.

In Fig. 9 a slightly different form of time controlling device is shown. A solenoid carried in a cylinder 80 is provided which will be included in the same circuit as was solenoid 50. Solenoid 80 has a core 81 to which is secured a member 82 having an upwardly extending portion 82a formed as a rack. Said rack engages a pinion 83 secured to a shaft 84 to which is also secured a gear 85. Gear 85 is secured to a shaft 86 also having secured thereto a pinion 87 meshing with gear 85. Shaft 86 has secured thereto a gear 88 meshing with a pinion 89 secured to a shaft 90. Shaft 90 carries a rotating crank arm 91 to which is pivotally connected one end of a pitman rod 92 pivotally connected at its other end to a crank arm 93 secured to a shaft 94 to which is also secured a disk 95 having at one side thereof adjacent its periphery a weight 96. Shafts 84, 87, 90 and 94 are journaled in bearings formed in a bracket 97 secured to cylinder 80.

With the construction shown in Fig. 9 the upward movement of core 81, which will correspond to core 52, will be retarded by the rotation of the gears and pinions described and the oscillation of disk 95 with its weight 96. Otherwise the operation of the device is the same as already described.

From the above description it is seen that applicant has provided a very simple and efficient construction of toasting mechanism and of a control means therefor. All the operator has to do is move handle 48 after placing the material in the device and the toasting will then be performed and the toast elevated automatically. The time of the toasting operation can be varied as desired and the time quite accurately determined. The device is quite simple in construction and very positive in operation. It is obvious that the same will have a high degree of utility for the purpose intended.

It will, of course, be understood that various changes may be made in the form, details, arrangement and proportions of the parts, without departing from the scope of applicants' invention, which generally stated, consists in a device capable of carrying out the objects above set forth in the parts and combinations of parts disclosed and defined in the appended claims.

What is claimed is:

1. A toaster construction having in combination a toast-supporting member vertically movable to toasting and non-toasting positions, a solenoid having a core connected to said member for moving the same upwardly, a circuit for said solenoid, a second solenoid having a movable core, a circuit for said second solenoid closed when said member is moved to and is in toasting position, means retarding the movement of said last mentioned core and a pair of contacts movable into engagement by action of said last mentioned core when it has moved a certain distance to close said first mentioned circuit, actuate said first mentioned solenoid and move said toast-supporting member upwardly to non-toasting position.

2. A toaster construction having in combination, a toast-supporting member movable vertically to toasting and non-toasting positions, a solenoid having a core connected to said member for moving the same upwardly to non-toasting position, a circuit for said solenoid, a second solenoid having a movable core, a circuit for said second solenoid closed when said member is in toasting position, means retarding the movement of said last mentioned core, a pair of contacts movable into engagement by action of said last mentioned core when it has moved a certain distance to close said first mentioned circuit, actuate said first mentioned solenoid and move said toast-supporting member to non-toasting position and means for varying the distance said last mentioned core must move to close said contacts to vary the time that said member remains in toasting position.

3. A toaster construction having in combination, a toast-supporting member movable vertically to toasting and non-toasting positions, a solenoid having a core connected to said member for moving the same, a circuit for said solenoid, a pair of contacts, one of which is carried by said core and closed when said member is in toasting position, a second solenoid having a movable core, a circuit for said second solenoid closed by engagement of said contacts, means for retarding the movement of said last mentioned core, a pair of contacts closed by said last mentioned core after a certain distance of travel thereof and means for varying said distance to vary the time said member is in toasting position.

4. A toaster construction having in combination, a toaster-supporting member movable to toasting and non-toasting positions, a solenoid having a core connected to said member for moving the same to non-toasting position, means for holding said member in said non-toasting position, a circuit for said solenoid, a pair of contacts adapted to be engaged to close said circuit, actuate said solenoid and move said member to non-toasting position, means operating a certain period of time after said member is moved to toasting position to engage said contacts and means for varying said time.

5. A toaster construction having in combination, a toast-supporting member movable by gravity to toasting position and movable to non-toasting positions, electro-magnetic means for moving said member vertically upward to non-toasting position, a solenoid having a movable core, a plunger carried by said core, a cylinder in which said plunger is movable having liquid therein, said liquid acting to retard the movement of said core into said solenoid, means actuated to operate said first mentioned means when said core reaches a certain position and means permitting a rapid movement of said plunger in a reverse direction.

6. A toaster construction having in combination, a toast-supporting member movable to toasting and non-toasting positions, electro-magnetic means for moving said member to non-toasting position, an electric circuit adapted to be closed for operating said means, a solenoid having a movable core, a plunger carried by said core, a cyinder in which said plunger is movable, having liquid therein, said liquid acting to retard the movement of said core into said solenoid, means actuated to close said circuit, operate said first mentioned means when said core reaches a certain position, and a thermostat member for suporting said plunger in different initial positions corresponding to the temperature of said toaster and thus varying the amount of movement of said core.

7. A toaster construction having in combination, a toast-supporting member vertically movable by gravity to toasting position and movable upwardly to non-toasting positions, heating means, a solenoid having a core connected to said member for moving the same to non-toasting position, a circuit for said solenoid, a pair of contacts closed when said member is in toasting position, a second solenoid having a movable core, means retarding the movement of said last mentioned core, a circuit for said second solenoid including said heating means and closed when said contacts are engaged, and means actuated after said last mentioned core has moved a certain distance for closing said first mentioned circuit, actuating said first mentioned solenoid, moving said member to non-toasting position and separating said contacts.

8. A toaster structure having in combination, a toast-supporting member vertically movable to toasting and non-toasting positions, electrically actuated means for moving said member to non-toasting position, a solenoid having a movable core, means retarding the movement of said core, a member attracted by said core after said core moves a certain distance, a pair of contacts moved into engagement by said member when so attracted, a permanent magnet holding said member in position with said contacts engaged, and a circuit closed by engagement of said contacts for actuating said electrically actuated means.

9. The structure set forth in claim 8, a circuit for said solenoid and means closing said circuit when said member is in toasting position.

10. A toaster construction having in combination, a toast-supporting member movable by gravity to toasting position and movable upwardly to non-toasting positions, a solenoid having a core connected to said member for moving the same to non-toasting position, latch means for holding said member in non-toasting position, a circuit for said solenoid, a timing device actuated when said member is moved to toasting position and means operated by said timing device after a certain period for closing said circuit to energize said solenoid and move said toast-supporting member to non-toasting position.

11. A toaster construction having in combination, a toast supporting member vertically movable to toasting and non-toasting positions, an electro-magnet having a core secured to said member for moving the same upwardly, a latch for holding said member in its upper non-toasting position, manually operated means for releasing said latch to permit said member to move to toasting position by gravity, an electro-magnetic timing device, a circuit for said timing device closed when said member moves to toasting position, a circuit for said electro-magnet including contacts closed by said timing device after a certain period whereby said electro-magnet is actuated and said member moved upwardly to non-toasting position and engaged with said latch.

OSCAR V. MALMQUIST.
FREDERICK J. FISCHER.